(No Model.) 2 Sheets—Sheet 1.
W. B. DICKSON.
WEIGHING AND REGISTERING ATTACHMENT FOR REFRIGERATORS.
No. 532,034. Patented Jan. 8, 1895.
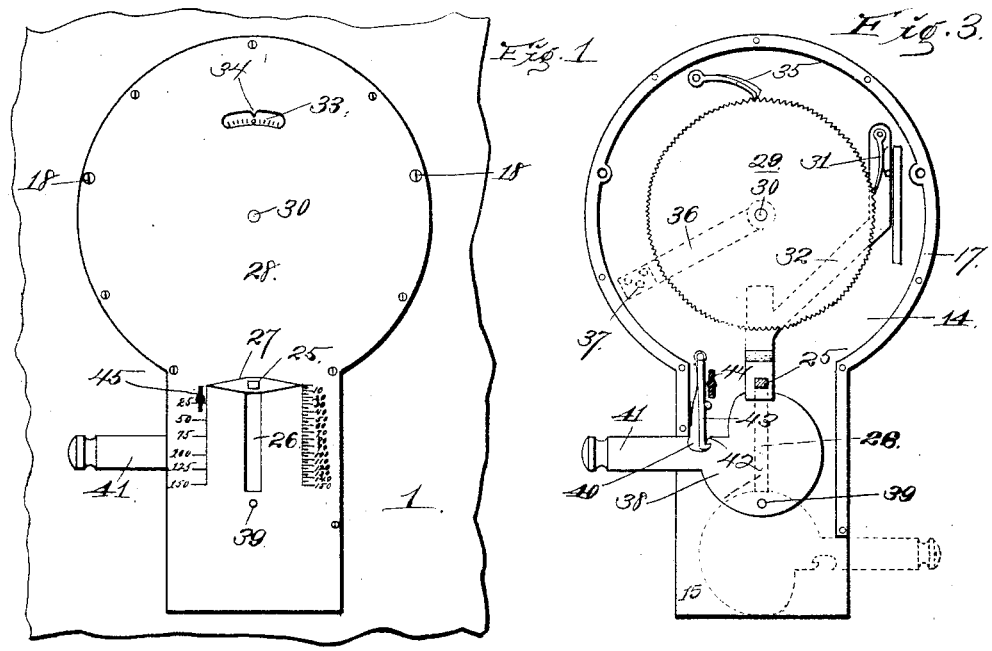
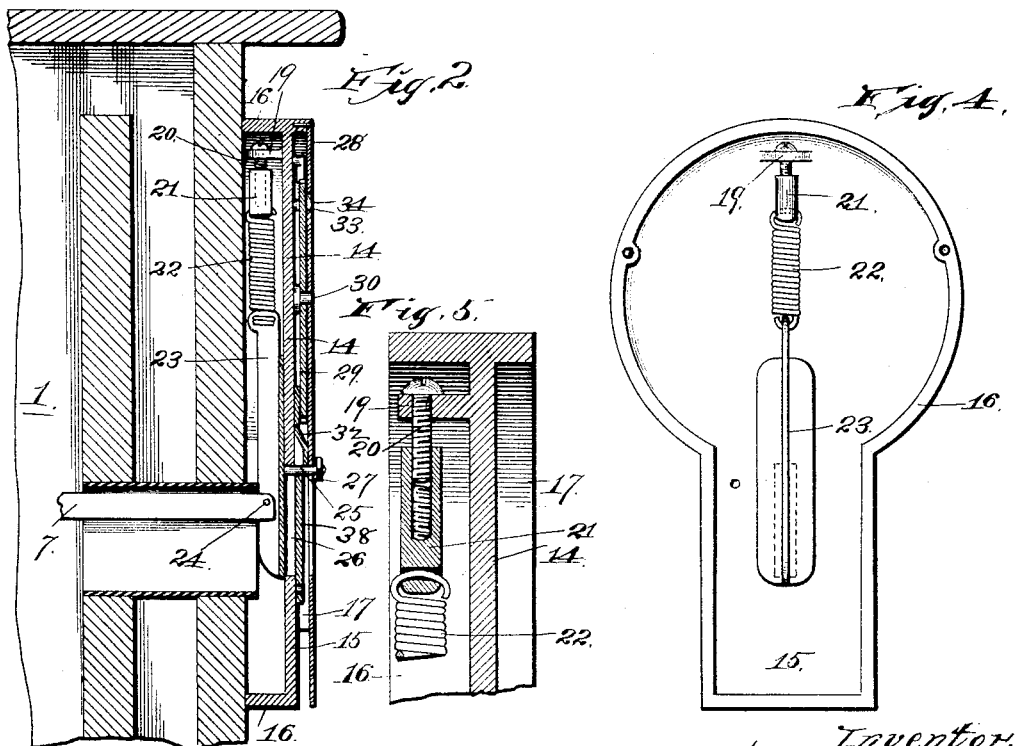
Witnesses:
M. O. Smith
Geo. Y. Thorpe
Inventor:
Wm. B. Dickson,
By Higdon & Higdon
Attys.

(No Model.) 2 Sheets—Sheet 2.
W. B. DICKSON.
WEIGHING AND REGISTERING ATTACHMENT FOR REFRIGERATORS.
No. 532,034. Patented Jan. 8, 1895.
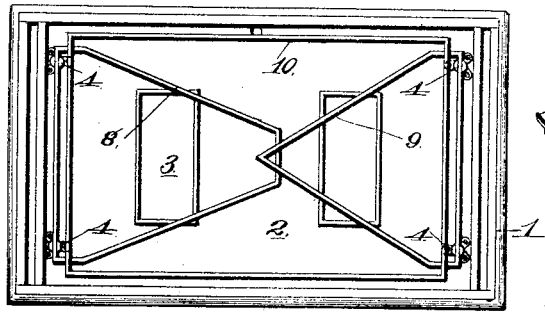
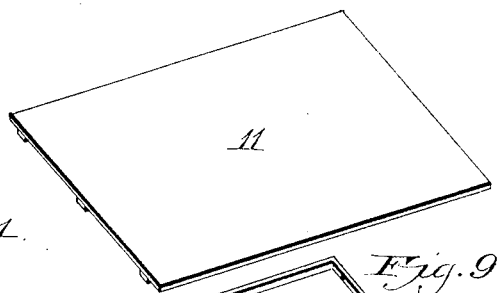
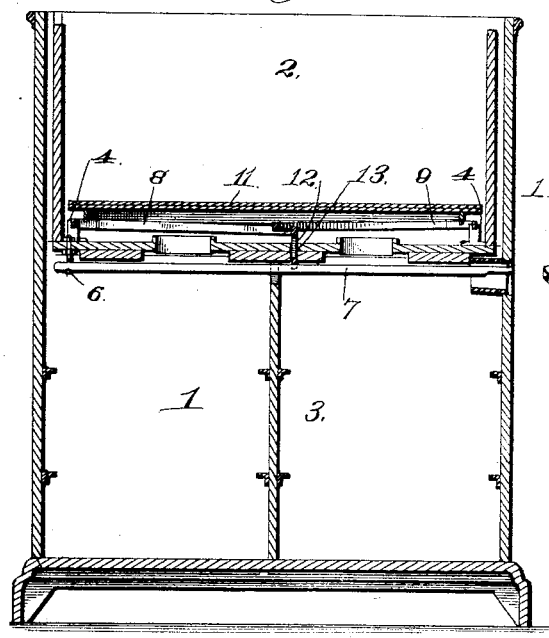
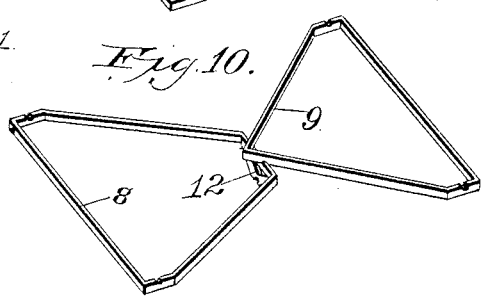
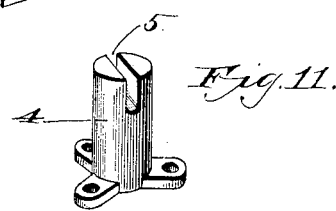

United States Patent Office.

WILLIAM B. DICKSON, OF KANSAS CITY, MISSOURI.

WEIGHING AND REGISTERING ATTACHMENT FOR REFRIGERATORS.

SPECIFICATION forming part of Letters Patent No. 532,034, dated January 8, 1895.

Application filed November 28, 1893. Serial No. 492,244. (No model.)

*To all whom it may concern:*

Be it known that I, WILLIAM B. DICKSON, of Kansas City, Jackson county, Missouri, have invented certain new and useful Improvements in Weighing and Registering Attachments for Refrigerators, of which the following is a full, clear, and exact description, reference being had to the accompanying drawings, forming a part hereof.

My invention relates to improvements in that class of weighing and registering attachments for refrigerators, which are provided with a weighing platform, and a registering or recording disk actuated from said platform.

The object of the invention is to produce means for locking said platform in its elevated position, and consequently preventing the rotation of the registering or recording disk.

My invention consists in certain peculiar and novel features of construction and combinations of parts, as hereinafter described and claimed, and illustrated in the accompanying drawings, in which—

Figure 1, is a view of a portion of a refrigerator with a device constructed in accordance with my invention applied thereto. Fig. 2, is a vertical central sectional view of the same. Fig. 3, is a face view of the device detached from the refrigerator, and with the front plate removed. Fig. 4, is a view of the inner face of the same. Fig. 5, is a vertical sectional view, showing the manner of adjusting the tension of the supporting spring. Fig. 6, is a plan view of a refrigerator with a weighing platform therein. Fig. 7, is a vertical longitudinal sectional view of the same. Figs. 8, 9, 10 and 11 are detail perspective views of parts of the weighing platform.

The weighing and registering mechanism herein shown is substantially the same as described and illustrated in my Patent No. 515,953, of March 6, 1894, for weighing and registering attachments for refrigerators, reference to which is herewith made for a detailed explanation of the construction and operation of the machine.

Referring to the drawings, where similar numerals refer to corresponding parts in all the figures, 1 designates a refrigerator which is divided in the usual manner into an upper or ice-compartment 2 and into a lower compartment 3. Secured upon the floor of the upper compartment, and near each corner thereof is a post or standard 4, which is notched or recessed as at 5. An eye-bolt 6 depends in the lower compartment near one end of the refrigerator, and pivotally mounted or fulcrumed therein in the usual manner is the fulcrum-bar or lever 7. The weighing platform proper, consists of the triangular frames 8 and 9, which are mounted in the notches or recesses 5 of the standards or posts 4, the rectangular frame 10, which is mounted upon the triangular frames 8 and 9, and the platform proper 11, which may be plain or corrugated as preferred, and which is mounted upon the frame 10, and is adapted to receive the ice or other articles to be weighed. The inner end of the frame 9 rests upon the inner end of the frame 8, and depending from the inner end of said frame 8 is an arm 12, which passes through an aperture 13 in the bottom of the ice-compartment, and rests upon the fulcrum-bar or lever 7. By this means, it will be seen that the platform occupies the least possible space in the refrigerator. A casting 14 is approximately circular in form, and is provided with a depending rectangular extension 15. An annular flange 16 projects marginally from one side of said casting, and a flange 17 projects marginally from the opposite side of said casting. This flange 17, however, is not annular. The casting 14 is arranged with the annular flange 16 fitting against the outer side of the refrigerator, with the extension 15 depending vertically opposite the free end of the fulcrum bar or lever 7, and is secured in this position by screws 18 or other suitable means.

Projecting rearwardly from the casting 14 is an arm 19, and passing vertically downward through said arm is a screw bolt 20 which engages the threaded socket of a block 21. A spring 22 operatively connects this block 21 with a plate 23, which is pivotally connected near its lower end to the free end of the fulcrum bar or lever 7, as at 24. This slide plate 23 is provided with a pin 25 which projects forwardly through a vertical slot 26 in the extension 15 of the casting, and carried upon the outer end of this pin is a double pointer or index finger 27, which is adapted to register with the scales inscribed upon the face or cover plate 28 of the casting.

From the foregoing, it will be seen that when a quantity of ice or other substance is placed upon the scale platform within the refrigerator, the fulcrum-bar or lever 7 moves downwardly, and being connected pivotally to the plate 23, causes the pointer or index finger 27 to indicate upon the face or cover plate 28, the weight or pressure upon the platform. In order to record this amount, a toothed disk or wheel 29 is mounted rotatably upon a stub-shaft 30 projecting centrally from the outer side of the casting, and the spring-actuated pawl 31, causes the disk or wheel 17 to rotate, and to display through the aperture 33, and opposite the pointer 34, upon the face or cover plate, the number of pounds and fractions thereof upon the platforms. In order to lock this disk in such position, or to prevent its backward rotation, the gravity pawls 35, which are pivotally carried by the casting, engage continually the teeth of the disk or wheel 29, and in order that the said disk or wheel shall be held from accidental rotation during the operation of the machine, or from the momentum it acquires in operation, I provide the friction-stop 36. Shown in dotted lines Fig. 3. This friction-stop, is preferably formed of spring-metal, and is secured at one end by rivets or other suitable means at 37 to the casting, and has its opposite end embracing the stub-shaft and bearing against the said disk or wheel at its central point.

I will now proceed to describe the mechanism for locking the platform in its elevated position, so that the same, and also the registering or recording mechanism shall be inoperative. In order to accomplish this, the cam-lever 38, which is pivoted at 39 to the outer side of the casting, and at the lower end of the slot 26, is provided with a notch or recess 40 in the handle portion 41. A shoulder 42 is also formed in the handle portion of the lever, and a spring-actuated pawl 43 automatically engages said shoulder and locks the cam-lever from further movement, when it is moved to the position shown in full lines Fig. 3. It will be apparent from this construction, that any weight or pressure applied upon the platform within the refrigerator, will not affect the position of the platform in the least, that is, it will not depress the same, and it will also be seen that it will be impossible to move the cam-lever to the position shown in dotted lines, same figure, without first disengaging the spring-actuated pawl from said shoulder 42. In order to disengage the spring-actuated pawl from said shoulder, so that the cam-lever may be moved to the position shown in dotted lines to allow the depression of the platform, it is necessary to introduce the key 44, through the key-hole 45, of the face or cover plate, and by turning the same properly, force the spring-actuated pawl from engagement with the shoulder 42. While the pawl is held out of engagement with the key, the cam-lever may be pivotally operated. The locking mechanism above described, prevents both the weighing and the registering operation.

Having thus described my invention, what I claim as new, and desire to secure by Letters Patent, is—

In a weighing and registering mechanism for refrigerators, the combination with a scale platform and a registering disk operatively connected thereto, of a cam-lever provided with a shoulder, and a spring-actuated pawl engaging said shoulder, to hold through the medium of the same, the weighing platform in its elevated and inoperative position, and also to hold the registering disk in an inoperative position, and means to disengage the spring-actuated pawl from the shoulder of said cam-lever, substantially as and for the purpose set forth.

In testimony whereof I affix my signature in presence of two witnesses.

WILLIAM B. DICKSON.

Witnesses:
MAUD FITZPATRICK,
G. Y. THORPE.